(12) United States Patent
Guo et al.

(10) Patent No.: US 12,282,396 B2
(45) Date of Patent: Apr. 22, 2025

(54) METHOD FOR APPARATUS FOR RECOVERING DATA OF DUAL-MACHINE HOT STANDBY SYSTEM, AND MEDIUM

(71) Applicant: SUZHOU METABRAIN INTELLIGENT TECHNOLOGY CO., LTD., Jiangsu (CN)

(72) Inventors: Chengyang Guo, Jiangsu (CN); Dongdong Yan, Jiangsu (CN)

(73) Assignee: SUZHOU METABRAIN INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/724,109

(22) PCT Filed: Dec. 26, 2022

(86) PCT No.: PCT/CN2022/142091
§ 371 (c)(1),
(2) Date: Jun. 25, 2024

(87) PCT Pub. No.: WO2023/240995
PCT Pub. Date: Dec. 21, 2023

(65) Prior Publication Data
US 2024/0419559 A1    Dec. 19, 2024

(30) Foreign Application Priority Data
Jun. 15, 2022 (CN) .......................... 202210671110.5

(51) Int. Cl.
*G06F 11/14* (2006.01)

(52) U.S. Cl.
CPC ...... *G06F 11/1469* (2013.01); *G06F 2201/80* (2013.01)

(58) Field of Classification Search
CPC .... G06F 16/00; G06F 16/113; G06F 11/1446; G06F 11/1469; G06F 2201/80
See application file for complete search history.

(56) References Cited

U.S. PATENT DOCUMENTS 9,684,566 B2 * 6/2017 Li .......................... G06F 3/0619
11,385,976 B1 * 7/2022 Krisman ............. G06F 11/1658
(Continued)

FOREIGN PATENT DOCUMENTS

| CN | 104378232 A | 2/2015 |
| CN | 105450717 A | 3/2016 |

(Continued)

OTHER PUBLICATIONS

International Search Report and Written Opinion for PCT/CN2022/142091 (Mar. 1, 2023).
(Continued)

*Primary Examiner* — Robert W Beausoliel, Jr.
*Assistant Examiner* — Susan F Rayyan
(74) *Attorney, Agent, or Firm* — Merchant & Gould P.C.

(57) ABSTRACT

Disclosed in the present disclosure are a data recovery method and apparatus for a dual-machine hot standby system, and a medium, which are applicable to the field of data processing. In the method, a main service running time period and a start time period are determined by means of a backed-up start-stop operation record file, and when the start time period is in the main service running time period, it indicates that a split-brain phenomenon possibly occurs in a dual-machine hot standby; and record information of a database backup record file within an initial split-brain time is further read, so as to determine the possibility of split-brain data, a final split-brain time is automatically determined, an Application Programming Interface (API) calling information file is read according to the final split-brain
(Continued)

time, so as to recover data, and operation information of a system during brain splitting is automatically restored.

20 Claims, 5 Drawing Sheets

(56) References Cited

U.S. PATENT DOCUMENTS

| | | | |
|---|---|---|---|
| 2002/0194276 A1 | 12/2002 | Endo | |
| 2009/0313311 A1* | 12/2009 | Hoffmann | G06F 11/2097 |
| 2010/0191884 A1* | 7/2010 | Holenstein | G06F 16/2343 |
| | | | 707/613 |
| 2011/0145635 A1 | 6/2011 | Buckler et al. | |
| 2011/0185227 A1* | 7/2011 | Sim-Tang | G06F 11/1471 |
| | | | 714/E11.023 |
| 2015/0112946 A1* | 4/2015 | Kao | G06F 11/1469 |
| | | | 707/654 |
| 2017/0147441 A1* | 5/2017 | Binford | G06F 11/1435 |
| 2018/0143884 A1* | 5/2018 | Brunzema | G06F 11/1471 |
| 2021/0303572 A1* | 9/2021 | Ouyang | H04L 67/125 |
| 2021/0349860 A1* | 11/2021 | Roscio | G06F 16/1815 |
| 2022/0121534 A1* | 4/2022 | Sontakke | G06F 11/2025 |
| 2022/0269570 A1* | 8/2022 | Agarwal | G06F 3/067 |
| 2022/0382657 A1* | 12/2022 | Liu | G06F 16/2365 |
| 2023/0004462 A1* | 1/2023 | Shao | G06F 11/1448 |
| 2023/0222122 A1* | 7/2023 | Ouyang | H04L 67/02 |
| | | | 707/634 |
| 2024/0004746 A1* | 1/2024 | Huang | G06F 11/0772 |
| 2024/0184674 A1* | 6/2024 | Kishanlal Joshi | G06F 11/181 |

FOREIGN PATENT DOCUMENTS

| | | |
|---|---|---|
| CN | 105472022 A | 4/2016 |
| CN | 114138732 A | 3/2022 |
| CN | 114461428 A | 5/2022 |
| CN | 1144756410 A | 7/2022 |

OTHER PUBLICATIONS

Chinese Search Report received for CN Serial No. 2022106711105 (Jul. 19, 2022).

* cited by examiner

METHOD FOR APPARATUS FOR RECOVERING DATA OF DUAL-MACHINE HOT STANDBY SYSTEM, AND MEDIUM

Cross-Reference to Related Application

This application is a National Stage filing under 35 U.S.C. § 371 of International Application number PCT/CN2022/142091, filed Dec. 26, 2022, which claims priority to Chinese Patent Application No. 202210671110.5 filed to the China National Intellectual Property Administration on Jun. 15, 2022 and entitled "Method and Apparatus for Recovering Data of Dual-Machine Hot Standby System, and Medium", the disclosure of which is hereby incorporated by reference in its entirety.

TECHNICAL FIELD

The present disclosure relates to the field of data processing, and in particular, to method and apparatus for recovering data of a dual-machine hot standby system.

BACKGROUND

The service operation of various industries in the society nowadays is increasingly reliant on computer systems, such that the safe and stable operation of computers is extremely important, and highly-available clusters serve systems with guaranteed persistence and uninterruptedness. A dual-machine hot standby is a common deployment form. Two identical server systems are deployed and are master and standby systems with each other through a heartbeat signal, etc. The two sets of systems guarantee a hot backup of data through methods such as real-time data synchronization. Once a running system fails and stops providing services to a system, another system takes over in time to continue to externally provide the same services, such that, regardless of the system on which a background is running, a user can access and operate the system at any time by simply using an Internet Protocol (IP) that interconnects a floating network.

When a communication network between dual-machine hot standby systems is unstable, master and standby roles may show situations such as competition and misjudgment, causing both systems to start main services to start providing services externally, in this case, each time the user logs in the system, background systems operated and accessed may not be a same system, resulting in different incremental data in two systems, and this phenomenon is a data split-brain phenomenon. At present, a method for processing data brain splitting of a dual-machine hot standby system is to select one node as a master node, select another node as a slave node to abandon incremental data, and directly copy the incremental data of the master node to the slave node, so as to recover normal running of a dual-machine hot standby. The processing method may cause the loss of partial operation data of a user to a certain extent, that is, deleting the incremental data of the slave node; and a recovery process comes at the cost of losing partial operation data, which puts data security at risk, thereby reducing the reliability of the dual-machine hot standby system.

SUMMARY

The present disclosure is intended to provide a data recovery method and apparatus for a dual-machine hot standby system, and a medium.

One aspect of embodiments of the present disclosure provides a method for recovering data of a dual-machine hot standby system, including the following operations.

Start-stop operation record files, database backup record files, and Application Programming Interface (API) calling information files, which correspond to two nodes of a dual-machine hot standby system, are acquired.

A main service running time period of a current node is determined according to the start-stop operation record files, and a start-stop time period of an opposite end node is determined according to the main service running time period.

When the start-stop time period is in the main service running time period, an initial split-brain time is determined according to a relationship between the start-stop time period and the main service running time period.

Record information of the database backup record files within the initial split-brain time is read to determine a final split-brain time, and the API calling information files is read according to the final split-brain time, so as to recover data.

In some embodiments, acquiring the start-stop operation record files, the database backup record files, and the API calling information files, which correspond to the two nodes of the dual-machine hot standby system includes the following operations.

Shared storage information of the dual-machine hot standby system is created, and the shared storage information includes the start-stop operation record files, the database backup record files, and the API calling information files.

A saving cycle of the shared storage information is set.

When the saving cycle exceeds a preset cycle, data of the shared storage information is updated according to an earliest time.

In some embodiments, the creating of the start-stop operation record file specifically includes the following steps.

A start time for the current node to start a main service is acquired.

A first sub-thread is called to record start time data in the start-stop operation record file.

When the current node stops the main service, a stop time of a current service is recorded.

The first sub-thread is called to record stop time data in the start-stop operation record file.

In some embodiments, the creating of the database backup record file specifically includes the following steps.

When the current node starts the main service, flag file information of the current node is created.

When the user calls an API, whether the flag file information exists is determined.

In a case that the flag file information exists, a time point when the user first logs in is determined, and a second sub-thread is called to perform database backup to the database backup record file.

In some embodiments, the creating of the API calling information file specifically includes the following step.

When the current node performs add, delete, and modify operations, a third sub-thread is called to store called API information data and a calling time record to the API calling information file.

In some embodiments, determining the main service running time period of the current node according to the start-stop operation record files, and determining the start-stop time period of the opposite end node according to the main service running time period includes the following operations.

First time points of start times corresponding to start and stop operations that are earliest recorded in the start-stop operation record files are compared.

Second time points of stop times corresponding to the start and stop operations are tracked according to the first time points.

A time period between the first time point and the second time point is used as a first time period, and the first time period is used as the main service running time period of the current node corresponding to the first time point and the second time point.

Whether the opposite end node has start times of start and stop operations of the opposite end node within the main service running time period is determined.

In a case that the opposite end node has the start times of the start and stop operations of the opposite end node within the main service running time period, the start times of the opposite end node are used as third time points, and fourth time points of stop times corresponding to the start and stop operations of the opposite end node are tracked according to the third time points.

A time period between the third time point and the fourth time point is used as a second time period, and the second time period is used as the start-stop time period of the opposite end node corresponding to the third time point and the fourth time point.

In a case that the opposite end node does not have the start times of the start and stop operations of the opposite end node within the main service running time period, a new first time point of the start time that appears adjacent to the first time period is acquired from the start-stop operation record file of the opposite end node, and the step of tracking the second time points of the stop times corresponding to the start and stop operations according to the first time points is returned.

In some embodiments, determining the initial split-brain time according to the relationship between the start-stop time period and the main service running time period includes the following operation.

A time period between the third time point corresponding to the start-stop time period and the second time point corresponding to the main service running time period is determined as the initial split-brain time, and the second time period is greater than the third time point.

In some embodiments, reading the record information of the database backup record files within the initial split-brain time to determine the final split-brain time includes the following operations.

Whether the record information of the time point within the initial split-brain time exists in the database backup record file is determined.

In a case that the record information of the time point within the initial split-brain time exists in the database backup record file, the time point is used as a start point, and a time period between the start point and the second time points corresponding to the initial split-brain time is used as the final split-brain time.

In some embodiments, reading the API calling information files according to the final split-brain time, so as to recover the data includes the following operations.

A time point of the final split-brain time is used as a start point to acquire the current node as a master node for recovery.

The API calling information file is read according to the earliest time, and recovery is performed at the master node.

After the master node reads the API calling information file, recovered data at the master node is synchronized to another node, so as to complete data recovery.

In some embodiments, the start-stop operation record file, the database backup record file, and the API calling information file are all saved and created by using a same format.

In some embodiments, after creating the database backup record file of the current node, the method further includes the following operation.

The flag file information of the current node is deleted.

In some embodiments, when the flag file information does not exist, the method further includes the following operation.

The third sub-thread is called to store API calling information of the current node.

Another aspect of embodiments of the present disclosure further provides a data recovery apparatus for a dual-machine hot standby system, including an acquisition component, a first determination component, a second determination component, and a recovery component.

The acquisition component is configured to acquire start-stop operation record files, database backup record files, and API calling information files, which correspond to two nodes of a dual-machine hot standby system.

The first determination component is configured to determine a main service running time period of a current node according to the start-stop operation record files, and determine a start-stop time period of an opposite end node according to the main service running time period.

The second determination component is configured to, when the start-stop time period is in the main service running time period, determine an initial split-brain time according to a relationship between the start-stop time period and the main service running time period.

The recovery component is configured to read record information of the database backup record files within the initial split-brain time to determine a final split-brain time, and read the API calling information files according to the final split-brain time, so as to recover data.

Another aspect of embodiments of the present disclosure further provides a data recovery apparatus for a dual-machine hot standby system, including a memory and a processor.

The memory is configured to store a computer program.

The processor is configured to implement, when executing the computer program, steps of the method for recovering data of a dual-machine hot standby system as described above.

Another aspect of embodiments of the present disclosure further provides a non-volatile computer-readable storage medium. The non-volatile computer-readable storage medium stores a computer program. Steps of the method for recovering data of a dual-machine hot standby system as described above are implemented when the computer program is executed by a processor.

BRIEF DESCRIPTION OF THE DRAWINGS

In order to describe the embodiments of the present disclosure more clearly, the drawings required to be used in the embodiments will be simply introduced below. It is apparent that the drawings in the following descriptions are only some embodiments of the present disclosure. Those of ordinary skill in the art may further obtain other drawings according to these drawings without creative work.

DETAILED DESCRIPTION OF THE EMBODIMENTS

The technical solutions in the embodiments of the present disclosure will be clearly and completely described below in combination with the drawings in the embodiments of the present disclosure. It is apparent that the described embodiments are only part of the embodiments of the present disclosure, not all the embodiments. All other embodiments obtained by those of ordinary skill in the art on the basis of the embodiments in the present disclosure without creative work all fall within the scope of protection of the present disclosure.

The core of the present disclosure is to provide a data recovery method and apparatus for a dual-machine hot standby system, and a medium, so as to guarantee the data security of a system and improve the running reliability of a dual-machine hot standby system.

In order to make those skilled in the art better understand the solutions of the present disclosure, the present disclosure is further described in detail below with reference to the drawings and specific implementations.

It is to be noted that, when a dual-machine hot standby system runs, read and write operations can only be performed on a database by a current master node generally, and a standby node does not have read-write permission, so as to avoid data disorder. When a split-brain phenomenon occurs, situations such as competition and misjudgment occur in the master and standby nodes due to roles, causing the two nodes to start main services to provide services externally, thus the two nodes may both be operated and accessed by a user, existing different incremental data. How to recover the incremental data and operation data during brain splitting is the main solution content of the present disclosure. The method for recovering data of a dual-machine hot standby system provided in the present disclosure is only suitable for the recovery of the split-brain phenomenon in a dual-machine hot standby scenario.

Figure 1:
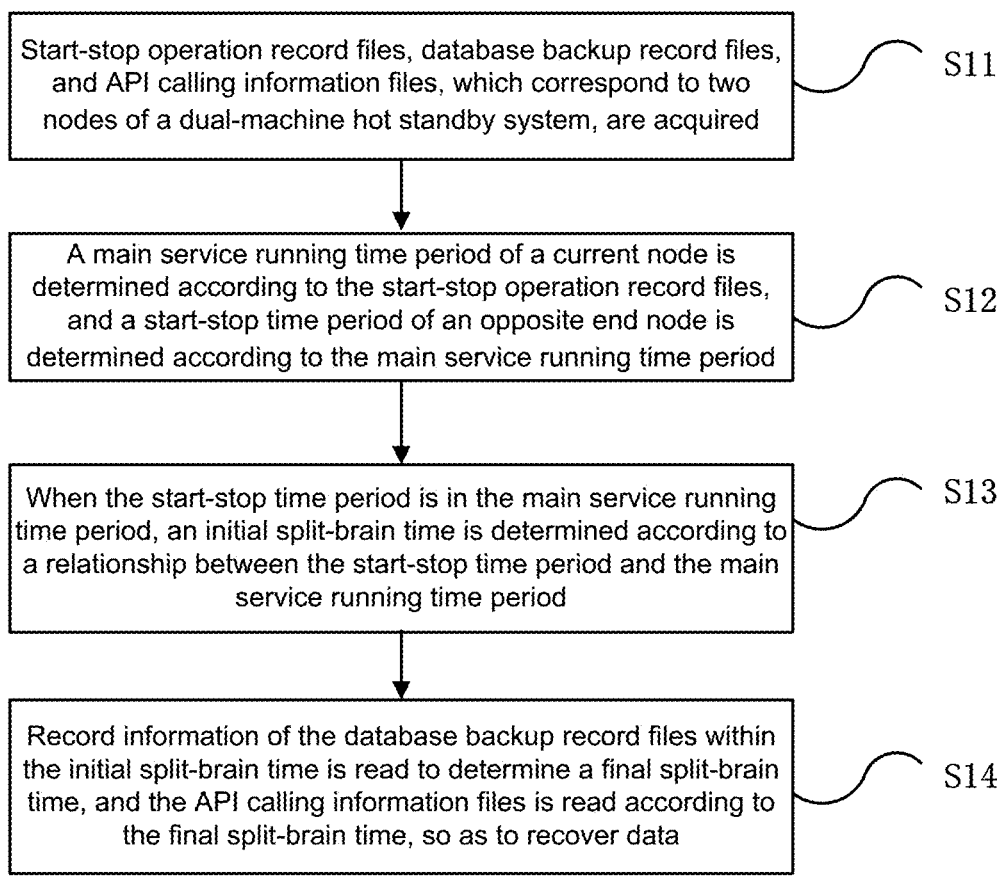
FIG. 1 is a flowchart of a method for recovering data of a dual-machine hot standby system according to embodiments of the present disclosure.

FIG. 1 is a flowchart of a method for recovering data of a dual-machine hot standby system according to embodiments of the present disclosure. As shown in FIG. 1, the method includes the following steps.

At S11, start-stop operation record files, database backup record files, and API calling information files, which correspond to two nodes of a dual-machine hot standby system, are acquired.

It is to be noted that, a dual-machine hot standby is based on hot standbys of two servers in a high availability system. The dual-machine high availability system is classified into a master-standby mode and a dual host mode according to a switching mode during operation. The master-standby mode means that one server is in an active state of a certain service, and the other server is in a standby state of the service. The dual host mode is that two different services respectively are in a master-standby state with each other on two servers.

The dual-machine hot standby system is a minimum composition unit of a cluster, and is to mount center servers as two servers that are backed up by each other, and only one server runs within a same time. When one running server fails and cannot be started, the other backup server automatically starts rapidly and runs, so as to guarantee the normal running of an entire network system.

A shared storage corresponding to two nodes of the dual-machine hot standby system is acquired, that is, one shared storage is added in the dual-machine hot standby system, and before brain splitting may occur in the system, a database in the system is backed up in advance. Meanwhile, when a use operates the system, a calling API and a calling time of the system are recorded in real time, and generated data and record files are saved into the shared storage. The shared storage includes the start-stop operation record files, the database backup record files, and the API calling information files, that is, the corresponding start-stop operation record file and database backup record file are respectively established for one node. Since an external service operation can only be performed on one node each time when the user operates the system, two nodes establish one API calling information file together.

Considering that a prerequisite for brain splitting occurring in the dual-machine hot standby system is that two nodes both start the main services and both have read-write permission for respectively databases, in this case, if the user logs in the system from a floating IP for a plurality of times, due to competitiveness, background systems logged by the user each time may be different, thus causing incremental data generated on two ends, and when and only when logging-in is performed for the first time after a main service of a node is started, the current database of the node is backed up, and a backed-up file is stored in the shared storage.

A process of service changes is run and monitored in two devices with dual machines, and when one device background starts a main service and a stop service, start or stop information is recorded in the shared storage, such that, when the split-brain phenomenon occurs in the dual-machine hot standby and data recovery needs to be performed, a time node of recovering the database is recommended to the user by depending on files recording main service start and stop information in the shared storage, and analyzing and determining possible occurrence time point information of the split-brain phenomenon in the system.

At S12, a main service running time period of the current node is determined according to the start-stop operation record files, and a start-stop time period of an opposite end node is determined according to the main service running time period.

It is understandable that, the start-stop operation record files are respectively established for two nodes in S11, the main service running time period of the current node needs to be determined in the two start-stop operation record files; and for a determination mode, an earliest record in which the main service is started may be used as a main record, whichever of the two nodes starts the earliest main service is the current node, and a stop time point of the record is tracked as the main service running time period according to the started main service. The start-stop time period corresponding to the opposite end node is found according to the found main service running time period.

In the determination mode, the two start-stop operation record files may also be compared by selecting a synchronization time period; if the split-brain phenomenon occurs, the two nodes simultaneously perform the main services at a same time period, then two time periods have overlapping time periods, and the node in which the earliest record is obtained by comparing the respectively time periods where the overlapping time periods occur in the two nodes is the current node. The determination mode is not specifically limited in the present disclosure, and may be set according to actual situations.

At S13, when the start-stop time period is in the main service running time period, an initial split-brain time is determined according to a relationship between the start-stop time period and the main service running time period.

When the start-stop time period is in the main service running time period, it indicates that the split-brain phenomenon occurs in the dual-machine hot standby system, the incremental data when the user performs operation each time is generated within the time periods of the respective nodes, since the incremental data only exists at one node within one time point, if the incremental data exists on the two nodes respectively, it indicates that the split-brain phenomenon occurs, and then the initial split-brain time is further determined according to the determined start-stop time period and the main service running time period, that is, the time period in the opposite end node record file is within the main service running time period determined by the current node, such that it may be considered that within the time period of the record, the two nodes both start the main services, and the split-brain phenomenon of data may occur.

At S14, record information of the database backup record files within the initial split-brain time is read to determine a final split-brain time, and the API calling information files is read according to the final split-brain time, so as to recover data.

Preliminarily determining the initial split-brain time for the start-stop operation record file in S13 needs to further improve determinacy according to the database backup record file. The record information of the database backup record file is read within the initial split-brain time to determine the final split-brain time, and the API calling information files is finally read according to the final split-brain time, so as to recover the data.

Specifically, whether the record information exists in the database backup record file is determined within the initial split-brain time; if the record information exists in the database backup record file, it is considered that a user logging-in situation exists at the time point of the record information, data generated by operations after logging-in at the time point belongs to split-brain data, and the split-brain data is not generated between a start time point of an initial split-brain time period and a start time point of the record information, such that a start time point of a split-brain time is more accurate, and the time period between the time point of the record information and a stop time point of the initial split-brain time is used as the final split-brain time.

Correspondingly, for the final split-brain time, the user may automatically select at what time point to recover the data. It is to be noted that, the time node must belong to a time period in the database backup record file, i.e., a selected recovery time point must be the time when a data backup operation is performed at the time point within the final split-brain time.

The method for recovering data of a dual-machine hot standby system provided in the embodiments of the present disclosure includes acquiring the start-stop operation record files, database backup record files, and API calling information files, which correspond to the two nodes of the dual-machine hot standby system; determining the main service running time period of the current node according to the start-stop operation record files, and determining the start-stop time period of the opposite end node according to the main service running time period; when the start-stop time period is in the main service running time period, determining the initial split-brain time according to the relationship between the start-stop time period and the main service running time period; and reading the record information of the database backup record files within the initial split-brain time to determine the final split-brain time, and reading the API calling information files according to the final split-brain time, so as to recover the data. In the method, a main service running time period and a start time period are determined by means of a backed-up start-stop operation record file, and when the start time period is in the main service running time period, it indicates that a split-brain phenomenon possibly occurs in a dual-machine hot standby; and record information of a database backup record file within an initial split-brain time is further read, so as to determine the possibility of split-brain data, a final split-brain time is automatically determined, an Application Programming Interface (API) calling information file is read according to the final split-brain time, so as to recover data, and operation information of a system during brain splitting is automatically restored. An optimal split-brain time is selected as a recovery time point for recovery, such that the existing situation of abandoning incremental data of one node as a cost is avoided, partial incremental data is effectively prevented from being abandoned when brain splitting occurring in a dual-machine hot standby system is repaired, the data security of the system is guaranteed, and the running reliability of the dual-machine hot standby system is improved.

On the basis of the above embodiments, acquiring the start-stop operation record files, database backup record files, and API calling information files, which correspond to the two nodes of the dual-machine hot standby system in S11 includes the following operations.

Shared storage information of the dual-machine hot standby system is created, and the shared storage information includes the start-stop operation record files, the database backup record files, and the API calling information files.

A saving cycle of the shared storage information is set.

When the saving cycle exceeds a preset cycle, data of the shared storage information is updated according to an earliest time.

Specifically, the present disclosure is intended to consider the relevance of data of the two nodes and the rapidity of data recovery during brain splitting when data brain splitting occurs in a system deployed with a dual-machine hot standby, such that the incremental data can be effectively accurately recovered, thereby ensuring the effectiveness of the user to system operations and the security of user data. First, one shared storage that may communicate with the two need to be added in the system deployed with the dual-machine hot standby, such that the two nodes both have read-write permission for data on the shared storage, and only a particular process in the system is allowed to have the read-write permission, thus storing files and records related to split-brain data recovery on the two nodes. Meanwhile, one API calling information file $File_{api}$, database backup record file $File_{back}$, and start-stop operation record file $File_{si}$ are created in the shared storage. It is to be noted that, for the two nodes, the start-stop operation record files respectively are $File_{s1}$ and $File_{s2}$.

Figure 2:
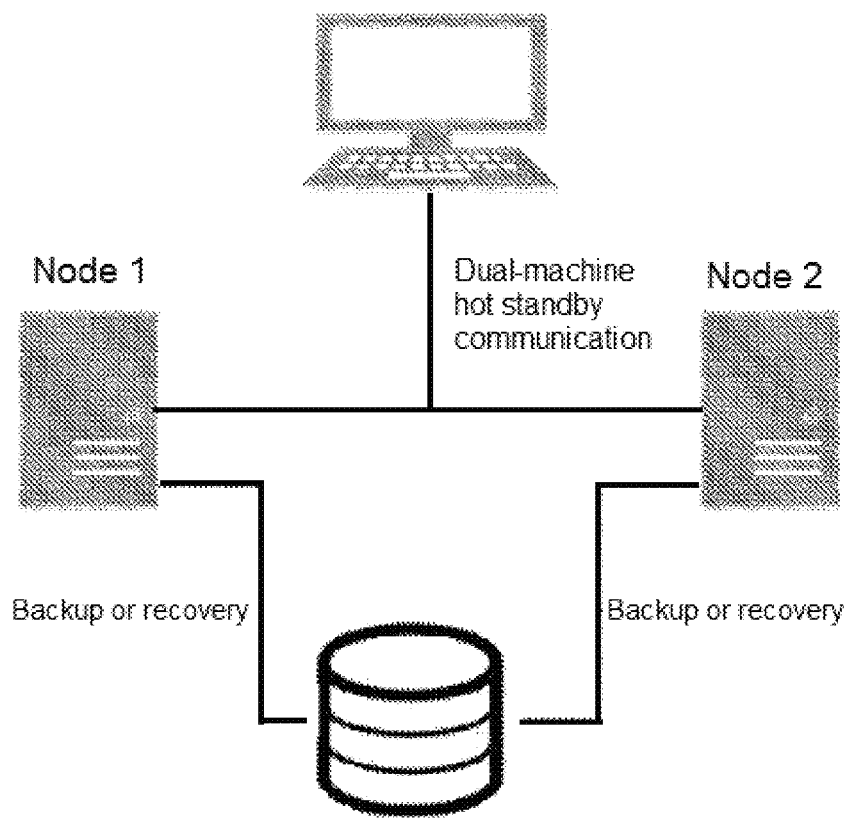
FIG. 2 is a schematic diagram of a deployment mode of a dual-machine hot standby system according to embodiments of the present disclosure.

FIG. 2 is a schematic diagram of a deployment mode of a dual-machine hot standby system according to embodiments of the present disclosure. As shown in FIG. 2, one shared storage is added for a Node 1 and a Node 2 in the dual-machine hot standby system, and the two nodes are respectively connected to master and standby devices through optical fiber for communication. When a dual-machine environment is initialized, the API calling information file $File_{api}$, database backup record file $File_{back}$, and start-stop operation record file $File_{si}$ are created in the shared storage.

In order to save new records and files, a saving cycle of shared storage information is set. In some embodiments, a preset cycle of the record files and database backup files is 7 days; and when the saving cycle exceeds 7 days, the earliest record and backup file is deleted first, and then the new records and files are saved.

In the embodiments of the present disclosure, the shared storage information of the dual-machine hot standby system is created, and the shared storage information includes the start-stop operation record files, the database backup record files, and the API calling information files; the saving cycle of the shared storage information is set; and when the saving cycle exceeds the preset cycle, the data of the shared storage information is updated according to the earliest time. Therefore, the relevance of data of the two nodes of the dual-machine hot standby system and the rapidity of split-brain data recovery are guaranteed, and new record files are saved and updated at the same time.

On the basis of the above embodiments, the creating of the start-stop operation record file specifically includes the following steps.

A start time for the current node to start a main service is acquired.

A first sub-thread is called to record start time data in the start-stop operation record file.

When the current node stops the main service, a stop time of a current service is recorded.

The first sub-thread is called to record stop time data in the start-stop operation record file.

Specifically, considering that, when the roles of the master and standby devices in the dual-machine hot standby system are switched, one node stops the main service and the other node re-starts the main service to take over the system, when data brain splitting occurs, both the two nodes must start the main services, such that the mechanism of the present disclosure records main service start-stop time information of the two nodes. When the Node 1 starts the main service, a sub-thread $P_1$ (first sub-thread) is immediately called after the service is started to record one piece of data: for example, $Time_i$=start, in the start-stop operation record file $File_{s1}$ of the Node 1; and before the Node 1 stops the main service, the first sub-thread is called to record one piece of data: for example, $Time_i$=stop, in the corresponding start-stop operation record file $File_{s1}$, where $Time_i$ is Beijing time.

In the embodiments of the present disclosure, the start time for the current node to start the main service is acquired; the first sub-thread is called to record the start time data in the start-stop operation record file; when the current node stops the main service, the stop time of the current service is recorded; and the first sub-thread is called to record the stop time data in the start-stop operation record file, such that a time reference is provided for all the main services started during subsequent data brain splitting, thereby facilitating the determination of a split-brain time.

On the basis of the above embodiments, the creating of the database backup record file specifically includes the following steps.

When the current node starts the main service, flag file information of the current node is created.

When the user calls an API, whether the flag file information exists is determined.

If the flag file information exists, a time point when the user first logs in is determined, and a second sub-thread is called to perform database backup to the database backup record file.

Specifically, since backing up a database is a relatively time-consuming operation, in order to not affect a logging-in operation of a system user, a separate thread is selected to be opened in the system to continue a backup operation of the database and a storage operation of a backup file. In order to ensure that data may be effectively and completely recovered when the split-brain phenomenon occurs in the dual-machine hot standby system, first, when a device starts a main service in the dual-machine system, one piece of flag file information initial_flag is created in a background of the device; when the user logs in the system, an API is called, and then whether the flag file information exists is determined; if the flag file information exists, a time point when the user first logs in may be determined; and a sub-thread $P_2$ (second sub-thread) is called to perform database backup to the database backup record file $File_{back}$. For example, $Time_{b\_i}$=absolute path of database backup file ($Time_{b\_i}$ indicates an $i^{th}$ backup record time).

If the flag file information does not exist, a third sub-thread P3 is called to store the API calling information of the current node without affecting the normal running of the system.

In some embodiments, in order to determine whether logging-in is performed for the first time, the backup file is sent to the shared storage and the flag file information is deleted, so as to ensure that after a node takes over the main service, a database backup record can only be generated when logging-in is performed for the first time, which may become main basic data for dual-machine hot standby split-brain data recovery.

For each node, the incremental data is not generated in local databases of respective nodes before the main service is started, such that it may be considered that, when the current node starts the main service, data of the local databases is synchronization data when the dual-machine hot standby is normal, and excludes any split-brain data. the data is the basis for system recovery when data brain splitting occurs in the dual-machine hot standby system of the present disclosure.

In the embodiments of the present disclosure, when the current node starts the main service, the flag file information of the current node is created; when the user calls the API, whether the flag file information exists is determined; and if the flag file information exists, the time point when the user first logs in is determined, and the second sub-thread is called to perform database backup to the database backup record file.

On the basis of the above embodiments, the creating of the API calling information file specifically includes the following step.

When the current node performs add, delete, and modify operations, a third sub-thread is called to store called API information data and a calling time record to the API calling information file.

Specifically, in order to ensure that all operation data of the user may be completely recovered after the split-brain phenomenon occurs in the dual-machine hot standby system, the API information called by the system when the user operates the system is recorded, and is recorded in relevant files of the shared storage according to a chronological order.

When the system is normal, when the user performs add, delete, and modify operations on the system, the third sub-thread $P_3$ is called to record and save the called API information data and the calling time to the API calling information file $File_{api}$. For example, $Time_{A\_i}$=API information, and $Time_{A\_i}$=indicates the time of an $i^{th}$ piece of the API calling information.

When the flag file information mentioned in the above embodiments does not exist, the third sub-thread $P_3$ is called to store the API calling information of the current node without affecting the normal running of the system.

In the embodiments of the present disclosure, when the current node performs the add, delete, and modify operations, the third sub-thread is called to store the called API information data and the calling time record to the API calling information file. Therefore, all operation data of the user may be completely recovered after the split-brain phenomenon occurs in the dual-machine hot standby system.

On the basis of the above embodiments, determining the main service running time period of the current node according to the start-stop operation record files, and determining the start-stop time period of the opposite end node according to the main service running time period in S12 includes the following operations.

First time points of start times corresponding to start and stop operations that are earliest recorded in the start-stop operation record files are compared.

Second time points of stop times corresponding to the start and stop operations are tracked according to the first time points.

A time period between the first time point and the second time point is used as a first time period, and the first time period is used as the main service running time period of the corresponding current node.

Whether the opposite end node has start times of start and stop operations of the opposite end node within the main service running time period is determined.

If the opposite end node has the start times of the start and stop operations of the opposite end node within the main service running time period, the start times of the opposite end node are used as third time points, and fourth time points of stop times corresponding to the start and stop operations of the opposite end node are tracked according to the third time points.

A time period between the third time point and the fourth time point is used as a second time period, and the second time period is used as the start-stop time period of the corresponding opposite end node.

If the opposite end node does not have the start times of the start and stop operations of the opposite end node within the main service running time period, a new first time point of the start time that appears adjacent to the first time period is acquired from the start-stop operation record file of the opposite end node, and the step of tracking the second time points of the stop times corresponding to the start and stop operations according to the first time points is returned.

Figure 3:
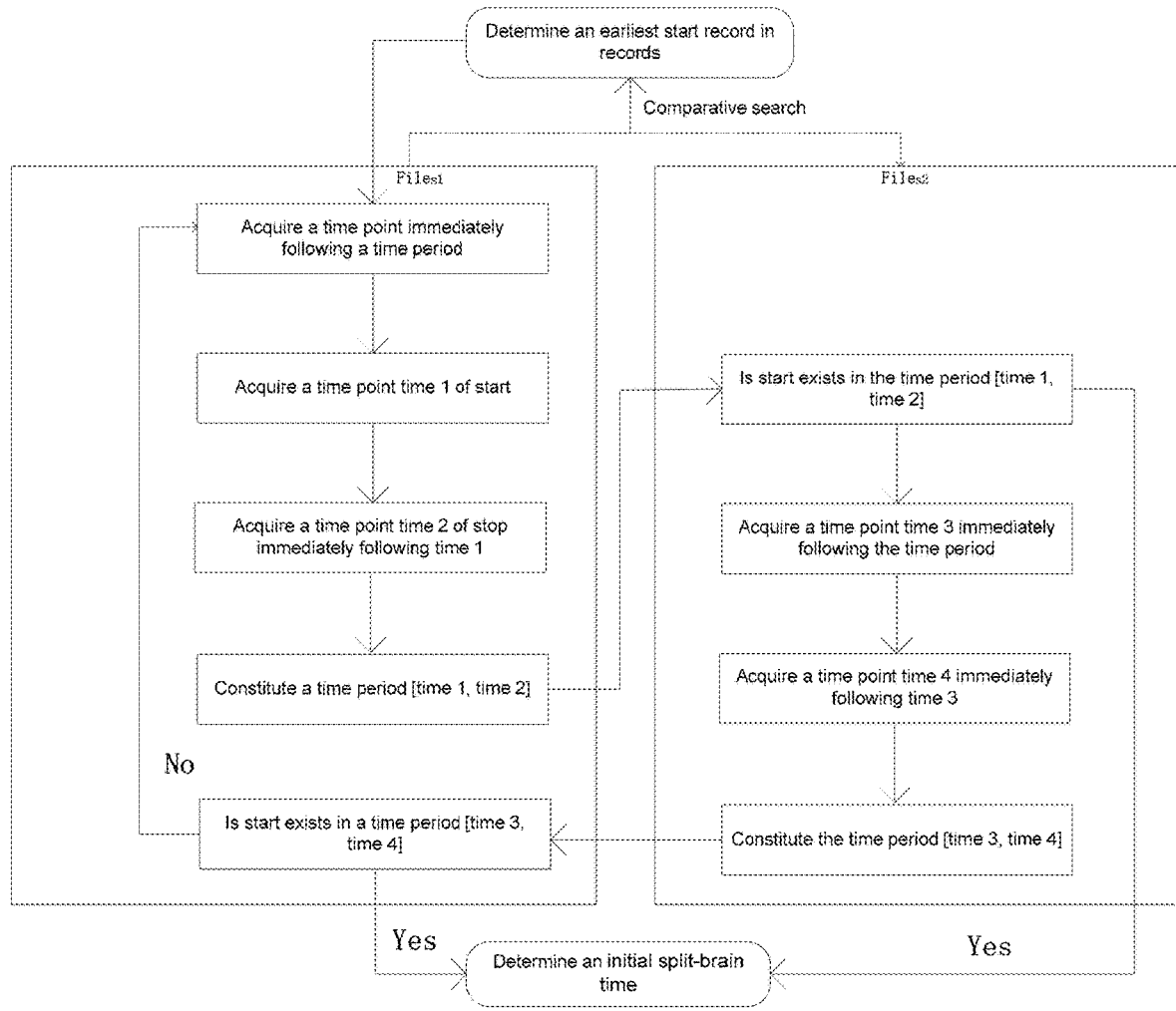
FIG. 3 is a schematic implementation diagram of an automatic determination mechanism of an initial split-brain time according to embodiments of the present disclosure.

Specifically, when data brain splitting occurs in the dual-machine hot standby system and system recovery needs to be performed, an approximate time point when the split-brain phenomenon occurs needs to be determined first. FIG. 3 is a schematic implementation diagram of an automatic determination mechanism of an initial split-brain time according to embodiments of the present disclosure. As shown in FIG. 3, contents of two start-stop operation record files $File_{s1}$ and $File_{s2}$ are respectively read, and start times corresponding to the earliest start and stop operations that are recorded in the two file records are selected, that is, a value is the earliest time point of start, $Time_1$ is recorded as a first time point; and stop times corresponding to the start and stop operations are tracked according to the first time point, that is, a next adjacent value in the same file is tracked and recorded as a time point $Time_2$ of stop, a time period between the first time point and a second time point is used as the first time period, and the first time period is used as the main service running time period $T_1[Time_1, Time_2]$ of the current node. It is understandable that, the current node may be the Node 1, or may also be the Node 2, and when the current node is used as the Node 1, the opposite end node is the Node 2.

In this case, all records between $T_1$ are found in a start-stop operation record of the opposite end node, and whether the opposite end node has the start times of the start and stop operations of the opposite end node within the $T_1$ main service running time period is determined, that is, whether there is a record that the value is start; if the opposite end node has the start times of the start and stop operations of the opposite end node within the main service running time period, the start times of the opposite end node are used as third time points, and fourth time points of the stop times corresponding to the start and stop operations are tracked according to the third time points. Specifically, after the $Time_2$ time point is found from an opposite end node record file, the time when start appears for the first time is recorded as $Time_3$, and the next value adjacent to $Time_3$ is recorded as a time point $Time_4$ of stop, so as to constitute $T_2[Time_3, Time_4]$, that is, the time period between a third time point and the fourth time point is used as a second time period $T_2$, and $T_2$ is used as the start-stop time period of the opposite end node. If the opposite end node does not have the start times of the start and stop operations of the opposite end node within the main service running time period, the new first time point of the start time that appears adjacent to the first time period is continuously acquired from the start-stop operation record file of the opposite end node.

In other words, using the opposite end node as the current node is returned again to the step of tracking the second time points of the stop times corresponding to the start and stop operations according to the first time points, until the start-stop time period of the opposite end node is determined according to the main service running time period, so as to determine the initial split-brain time according to the two time periods.

In the embodiments of the present disclosure, the main service running time period of the current node is determined according to the start-stop operation record files, and the start-stop time period of the opposite end node is determined according to the main service running time period, thereby facilitating the determination of the approximate time point when the split-brain phenomenon occurs.

On the basis of the above embodiments, determining the initial split-brain time according to the relationship between the start-stop time period and the main service running time period in S13 includes the following operation.

A time period between the third time point corresponding to the start-stop time period and the second time point corresponding to the main service running time period is determined as the initial split-brain time, and the second time period is greater than the third time point.

Specifically, after the start-stop time period and the main service running time period are determined, the initial split-brain time is then determined according to a relationship between the start-stop time period and the main service running time period, i.e., the time period between the third time point corresponding to the start-stop time period and the second time point corresponding to the main service running time period is determined as the initial split-brain time.

The time point Time, of a record in which a value is start in the opposite end node record file occurs at the main service running time period $T_i[Time_j, Time_h]$ determined by the current node, it may be considered that in the time period $[Time_i, Time_h]$ from the time point Time, of the record to $Time_h$, both the master and standby nodes start the main services, and the split-brain phenomenon of data may occur.

For example, the Node 1 determines the main service running time period $T_1[Time_1, Time_2]$, and the Node 2 determines the start-stop time period $T_2[Time_3, Time_4]$, where the initial split-brain time is $[Time_3, Time_2]$.

In the embodiments of the present disclosure, the time period between the third time point corresponding to the start-stop time period and the second time point corresponding to the main service running time period is determined as the initial split-brain time, and the possible split-brain phenomenon of data may be preliminarily determined according to the start-stop operation record, so as to reduce a range of subsequently determining final split-brain data.

On the basis of the above embodiments, reading the record information of the database backup record files within the initial split-brain time to determine the final split-brain time in S14 includes the following operations.

Whether the record information of the time point within the initial split-brain time exists in the database backup record file is determined.

If the record information of the time point within the initial split-brain time exists in the database backup record file, the time point is used as a start point, and a time period between the second time points corresponding to the initial split-brain time is used as the final split-brain time.

Specifically, within the initial split-brain time when the occurrence of the possible split-brain phenomenon is preliminarily determined, the final split-brain time is further determined, and then whether the record information within the initial split-brain time exists in the database backup record file is read. In combination with the above examples, whether a record within the time period $[Time_3, Time_2]$ exists in the database backup record file of the shared storage is determined; if $Time_{b\_i}$ of the record exists within the time period $[Time_3, Time_2]$, it is considered that a user logging-in situation exists at $Time_{b\_i}$, and data generated after operations after logging-in at the time point belongs to the split-brain data, such that the possibility of the split-brain data from $Time_{b\_i}$ is large. Thus, the final split-brain time is $[Time_{b\_i}, Time_2]$, and whether the time point is used as a start point to recover data may also be determined by the user.

It is to be noted that, any time point within the final split-brain time provided in the embodiments of the present disclosure is used as a start point, the user selects this point as the start for recovering the data, and a final time ends at the time point $Time_2$.

In addition, if the record information of the time point within the initial split-brain time does not exist in the database backup record file, data recovery may also be performed according to the initial split-brain time, or the operation is directly deleted, and a running state of hardware is examined to guarantee whether the dual-machine hot standby system normally runs.

In the embodiments of the present disclosure, the record information of the database backup record files within the initial split-brain time is read to determine the final split-brain time, and the initial split-brain time is determined through the start-stop operation record file, so as to determine the final split-brain data according to the database backup record file, such that the accuracy of the recovery time of the system is guaranteed, and when data brain splitting occurs, split-brain data in the system may be effectively and accurately recovered to avoid data loss and system disorder, thereby effectively improving the stability and reliability of the dual-machine hot standby system.

On the basis of the above embodiments, reading the API calling information files according to the final split-brain time, so as to recover the data in S14 includes the following operations.

A time point of the final split-brain time is used as a start point to acquire the current node as a master node for recovery.

The API calling information file is read according to the earliest time, and recovery is performed at the master node.

After the master node reads the API calling information file, recovered data at the master node is synchronized to another node, so as to complete data recovery.

Specifically, according to time node information that the user selects for recovery, the database backup record file corresponding to the time point is taken out to recover the node of the system. Since the currently-recovered data is only the data when the user first logs in after system brain splitting, and the user has not recovered data of a series of operations of the system after brain splitting, by analyzing and using the API calling information file, the system is enabled to automatically execute the operations of the user after brain splitting once again, so as to realize complete recovery of system data.

Definitely, the user may also perform split-brain recovery according to a split-brain time point automatically determined by the system. In some embodiments, the time point $Time_{b\_i}$ of the final split-brain time is used as a start point, one of the nodes is selected as a master node for recovery, the node is operated to start the main service, the other node stops services, then a thread is used to read the database backup file of the time point in the shared storage, and database recovery is performed, and the data on the current node is recovered to data at a backup time node of the selected database backup file.

Data brain splitting starts occurring from the time point of the node, such that the split-brain data may exist in different database backup files, and thus cannot be well taken out for arrangement and recovery. In order to effectively recover the incremental data generated after brain splitting occurs in the dual-machine hot standby system, the content of the API calling information file $File_{api}$ is selected and read from the shared storage, the time point $Time_{b\_j}$ is used as a start point, according to a chronological order, the system is enabled to automatically execute operations recorded in the file $File_{api}$ step by step, when the API calling information is completely executed, it may be considered that the data on the node has been recovered to latest data, and finally, the current node is synchronized to the opposite end node in the dual-machine system. In this way, the entire data recovery process is all completed, and the system continues to run stably.

In the embodiments of the present disclosure, the time point of the final split-brain time is used as the start point to acquire the current node as the master node for recovery; the API calling information file is read according to the earliest time, and recovery is performed at the master node; and after the master node reads the API calling information file, the recovered data at the master node is synchronized to another node, so as to complete data recovery. An optimal recovery time point is selected to determine the recovered database file and the API calling information, and finally, all the data of the entire system is accurately and completely recovered, thereby further enhancing the protection of the system data.

On the basis of the above embodiments, in order to the recovery of the data of the entire process and the analysis of determining the split-brain data, the start-stop operation record file, the database backup record file, and the API calling information file are all saved and created by using a same format.

Data is saved by using a format of key=value, for example, in the API information record file $File_{api}$, an operation time is saved as a key, and a called API operation interface and data are saved as values. In addition, one file/data/database backup file for saving is created.

In the embodiments of the present disclosure, the start-stop operation record file, the database backup record file, and the API calling information file are all saved and created by using a same format, facilitating subsequent data analysis.

Figure 4:
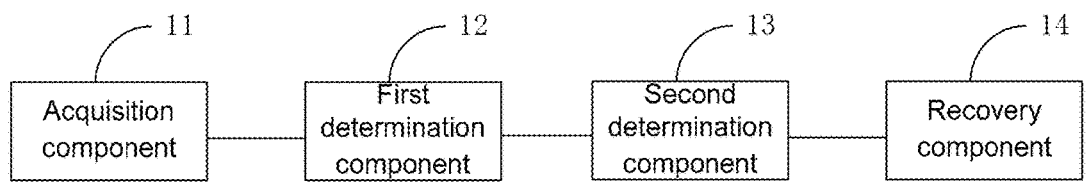
FIG. 4 is a structural diagram of a data recovery apparatus for a dual-machine hot standby system according to embodiments of the present disclosure.

Various embodiments corresponding to the method for recovering data of a dual-machine hot standby system are described in detail. Based on this, the present disclosure further discloses a data recovery apparatus for a dual-machine hot standby system corresponding to the method. FIG. 4 is a structural diagram of a data recovery apparatus for a dual-machine hot standby system according to embodiments of the present disclosure. As shown in FIG. 4, the data recovery apparatus for a dual-machine hot standby system includes an acquisition component, a first determination component, a second determination component, and a recovery component.

The acquisition component 11 is configured to acquire start-stop operation record files, database backup record files, and API calling information files, which correspond to two nodes of a dual-machine hot standby system.

The first determination component 12 is configured to determine a main service running time period of the current node according to the start-stop operation record files, and determine a start-stop time period of an opposite end node according to the main service running time period.

The second determination component 13 is configured to, when the start-stop time period is in the main service running time period, determine an initial split-brain time according to a relationship between the start-stop time period and the main service running time period.

The recovery component 14 is configured to read record information of the database backup record files within the initial split-brain time to determine a final split-brain time, and read the API calling information files according to the final split-brain time, so as to recover data.

Since the embodiments of the apparatus portion and the embodiments correspond to each other, for the embodiments of the apparatus portion, refer to the description of the embodiments of the method portion, and details are not described herein again.

The introduction of the data recovery apparatus for a dual-machine hot standby system provided in the present disclosure is referred to the above method embodiments, is not described in the present disclosure herein again, and has the beneficial effects same as the method for recovering data of a dual-machine hot standby system.

Figure 5:
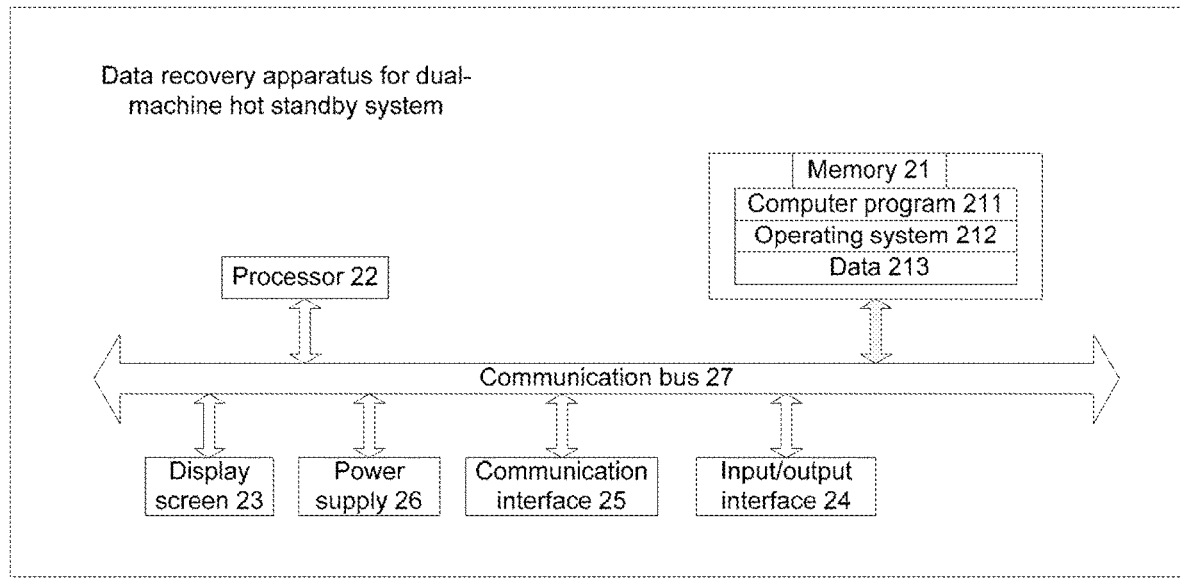
FIG. 5 is a structural diagram of another data recovery apparatus for a dual-machine hot standby system according to embodiments of the present disclosure.

FIG. 5 is a structural diagram of another data recovery apparatus for a dual-machine hot standby system according to embodiments of the present disclosure. As shown in FIG. 5, the apparatus includes a memory and a processor.

The memory 21 is configured to store a computer program.

The processor 22 is configured to implement, when executing the computer program, steps of the method for recovering data of a dual-machine hot standby system.

The data recovery apparatus for a dual-machine hot standby system provided in this embodiment may include, but is not limited to, a smartphone, a tablet computer, a laptop computer, a desktop computer, etc.

The processor 22 may include one or more processing cores, such as a 4-core processor, an 8-core processor, etc. The processor 22 may be implemented by using at least one hardware form of Digital Signal Processing (DSP), Field-Programmable Gate Array (FPGA), or Programmable Logic Array (PLA). The processor 22 may further include a main processor and a co-processor. The main processor is a processor configured to process data in a wake-up state, which is also referred to as a Central Processing Unit (CPU); and the co-processor is a low-power processor configured to process data in a standby state. In some embodiments, the processor 22 may be integrated with a Graphics Processing Unit (GPU), and the GPU is configured to render and draw contents that a display screen needs to display. In some embodiments, the processor 22 may further include an Artificial Intelligence (AI) processor, and the AI processor is configured to process a calculating operation related to machine learning.

The memory 21 may include one or more non-volatile computer-readable storage media, and the non-volatile computer-readable storage medium may be non-transient. The memory 21 may further include a high-speed random access memory and a non-volatile memory, for example, one or more disk storage devices and flash storage devices. In this embodiment, the memory 21 is at least configured to store the following computer program 211. After the computer program is loaded and executed by the processor 22, related steps of the method for recovering data of a dual-machine hot standby system disclosed in any one of the above embodiments can be implemented. In addition, resources stored in the memory 21 may further include an operating system 212, data 213, and the like, and a storage mode may be transient or permanent. The operating system 212 may include Windows, Unix, Linux, etc. The data 213 may include, but is not limited to, the data involved in the method for recovering data of a dual-machine hot standby system, etc.

In some embodiments, the data recovery apparatus for a dual-machine hot standby system may further include a display screen 23, an input/output interface 24, a communication interface 25, a power supply 26, and a communication bus 27.

It may be understood by those skilled in the art that structures shown in FIG. 5 do not constitute limitations to the data recovery apparatus for a dual-machine hot standby system, and may include more or less components shown in the figures.

The processor 22 implements the method for recovering data of a dual-machine hot standby system provided by any one of the above embodiments by calling an instruction stored in the memory 21.

The introduction of another data recovery apparatus for a dual-machine hot standby system provided in the present disclosure is referred to the above method embodiments, is not described in the present disclosure herein again, and has the beneficial effects same as the method for recovering data of a dual-machine hot standby system.

Further, the present disclosure further provides a non-volatile computer-readable storage medium. The non-volatile computer-readable storage medium stores a computer program. Steps of the method for recovering data of a dual-machine hot standby system as described above are implemented when the computer program is executed by the processor 22.

It is understandable that, if the method in the above embodiments is implemented in the form of the software functional unit and sold or used as an independent product, it can be stored in the computer readable storage medium. Based on this understanding, the technical solutions of the present disclosure essentially or the parts that contribute to the prior art, all or part of the technical solutions can be embodied in the form of a software product. The computer software product is stored in a storage medium to execute all or part of the steps of the method described in the various embodiments of the present disclosure. The storage medium includes: various media capable of storing program codes such as a U disk, a mobile Hard Disk Drive (HDD), a Read-Only Memory (ROM), a Random Access Memory (RAM), a magnetic disk or an optical disk.

Figure 6:
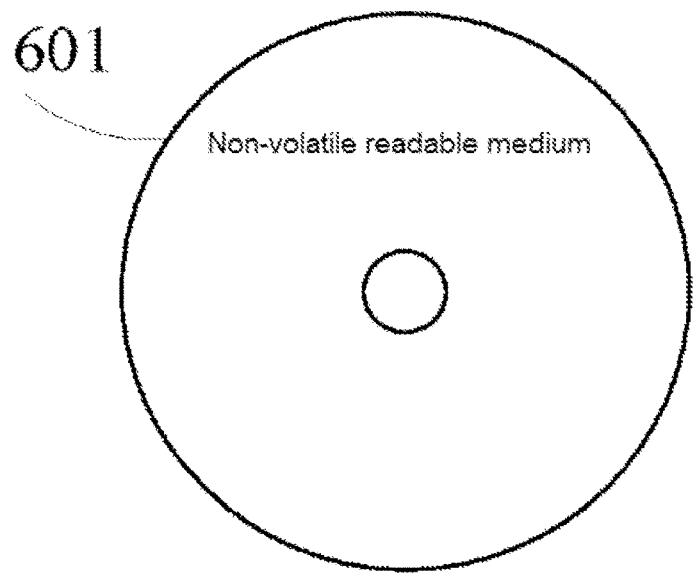
FIG. 6 is a schematic diagram of a non-volatile computer-readable storage medium according to embodiments of the present disclosure.

As shown in FIG. 6, the present disclosure further provides a non-volatile computer-readable storage medium 601. The non-volatile computer-readable storage medium stores an instruction. When the instruction is run on a computer, the computer is enabled to execute the method for recovering data of a dual-machine hot standby system in the above embodiments.

In some embodiments, the present disclosure further provides a computer program product including an instruction. When the computer program product is run on a computer, the computer is enabled to execute the method for recovering data of a dual-machine hot standby system in the above embodiments.

The introduction of the non-volatile computer-readable storage medium provided in the present disclosure is referred to the above method embodiments, is not described in the present disclosure herein again, and has the beneficial effects same as the method for recovering data of a dual-machine hot standby system.

Figure 7:
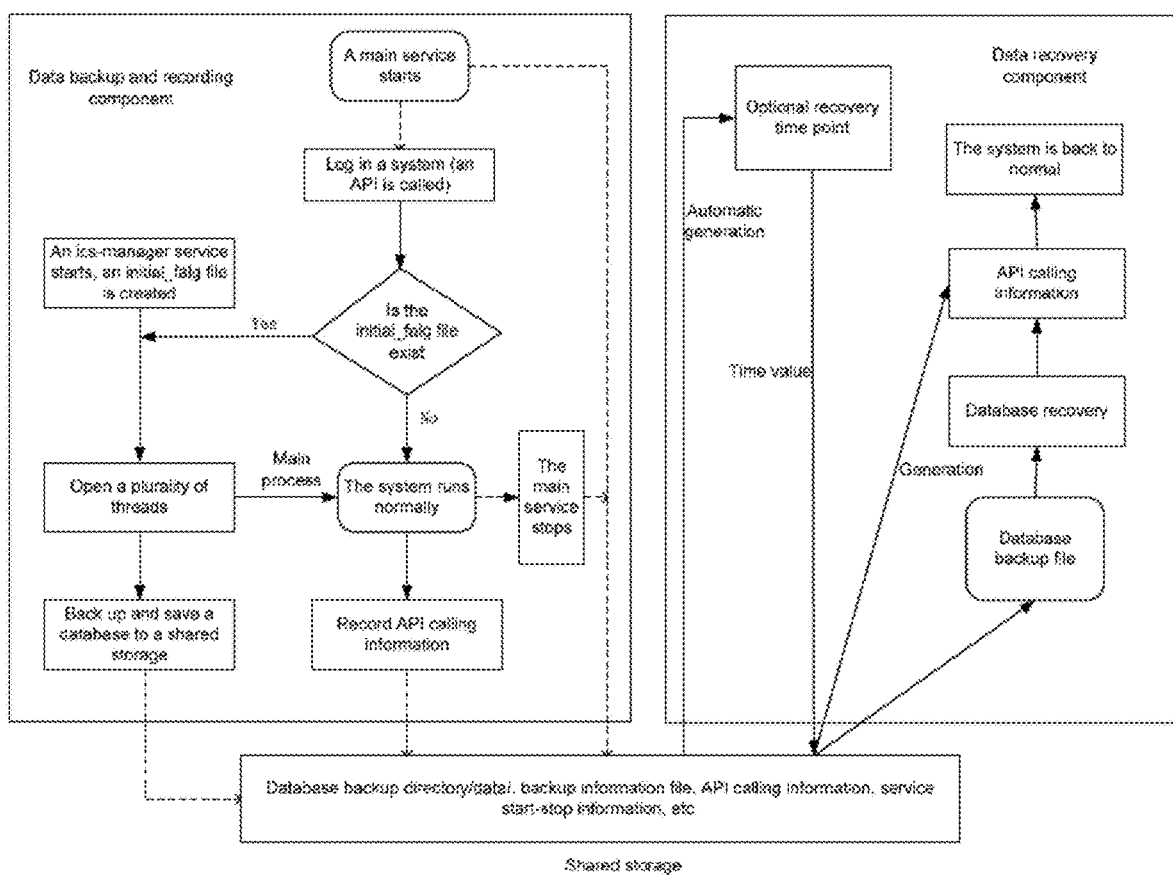
FIG. 7 is a schematic diagram of a method for recovering data of a dual-machine hot standby system according to embodiments of the present disclosure.

FIG. 7 is a schematic diagram of a method for recovering data of a dual-machine hot standby system according to embodiments of the present disclosure. As shown in FIG. 7, in a process that a system runs normally, one piece of flag file information initial_flag is created in a background of a device; whether data needs to be backed up is determined by using a method of combining a main service and the number of logging-in times; when a user logs in the system, an API is called, and then whether the flag file information exists is determined; and if the flag file information exists and needs to be backed up, current database data is backed up, and a plurality of threads are opened to save and record backup files into a shared storage. It is to be noted that, the time for creating the flag file information initial_flag is created when an ics-manager service is started. When the flag file information initial_flag does not exist, the system normally runs; when the user logs in the system to perform various operations, API information called by the system and a calling time are recorded, and are recorded in a file $File_{api}$ of the shared storage. The shared storage includes a database backup directory/data/, a backup information file, API calling information, service start-stop information, etc. When data brain splitting occurs in the dual-machine hot standby system, a dual-machine hot standby is first recovered to run normally, and then is recommended to the user, so as to select a recovery time point according to the user, then data on a master node is recovered by using the database backup file in the shared storage, then a series of operations are automatically performed according to the time and API information in $File_{api}$, and incremental data of the user during brain splitting is recovered, such that the system recovers intact data and continues to provide reliable services.

The introduction of the schematic diagram of the method for recovering data of a dual-machine hot standby system provided in the present disclosure is referred to the above method embodiments, is not described in the present disclosure herein again, and has the beneficial effects same as the method for recovering data of a dual-machine hot standby system.

The data recovery method and apparatus for a dual-machine hot standby system, and the medium provided in the present disclosure are introduced in detail above. Each embodiment in this specification is described in a progressive manner, and each embodiment focuses on the differences from other embodiments, and the same or similar parts of each embodiment may be referred to each other. For the apparatus disclosed in the embodiments, since the apparatus corresponds to the method disclosed in the embodiments, the description is relatively simple, and for related parts, refer to the partial descriptions of the method. It should be noted that for a person of ordinary skill in the art, without departing from the principles of the present disclosure, several improvements and modifications may be made to the present disclosure, which also fall within the scope of protection of the claims of the present disclosure.

It is also to be noted that relational terms such as first and second are used merely to distinguish one entity or operation from another entity or operation herein, and do not necessarily require or imply the existence of any such actual relationship or order between these entities or operations. Furthermore, terms "comprise", "include"or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase "comprising one" does not exclude existence of other same elements in the process, the method, the article, or the device that includes the elements.

What is claimed is:

1. A method for recovering data of a dual-machine hot standby system, comprising:

acquiring start-stop operation record files, database backup record files, and Application Programming Interface (API) calling information files, which correspond to two nodes of a dual-machine hot standby system;

determining a main service running time period of a current node according to the start-stop operation record files, and determining a start-stop time period of an opposite end node according to the main service running time period;

when the start-stop time period is in the main service running time period, determining an initial split-brain time according to a relationship between the start-stop time period and the main service running time period; and reading record information of the database backup record files within the initial split-brain time to determine a final split-brain time, and reading the API calling information files according to the final split-brain time, so as to recover data.

2. The method for recovering data of the dual-machine hot standby system according to claim 1, further comprising:

disposing a shared storage in the dual-machine hot standby system such that a database in the dual-machine hot standby system is backed up in advance before brain splitting occurs in the dual-machine hot standby system.

3. The method for recovering data of the dual-machine hot standby system according to claim 2, further comprising:

when a user operates the dual-machine hot standby system, recording a calling API and a calling time of the dual-machine hot standby system in real time; and saving generated data and record files into the shared storage.

4. The method for recovering data of the dual-machine hot standby system according to claim 3, wherein acquiring the start-stop operation record files, the database backup record files, and the API calling information files, which correspond to the two nodes of the dual-machine hot standby system comprises:

creating shared storage information of the dual-machine hot standby system, wherein the shared storage information comprises the start-stop operation record files, the database backup record files, and the API calling information files;

setting a saving cycle of the shared storage information; and when the saving cycle exceeds a preset cycle, updating data of the shared storage information according to an earliest time.

5. The method for recovering data of the dual-machine hot standby system according to claim 4, wherein the creating of the start-stop operation record file comprises:

acquiring a start time for the current node to start a main service;

calling a first sub-thread to record start time data in the start-stop operation record file;

when the current node stops the main service, recording a stop time of a current service; and calling the first sub-thread to record stop time data in the start-stop operation record file.

6. The method for recovering data of the dual-machine hot standby system according to claim 5, wherein the creating of the database backup record file comprises:

when the current node starts the main service, creating flag file information of the current node;

when the user calls an API, determining whether the flag file information exists; and in a case that the flag file information exists, determining a time point when the user first logs in, and calling a second sub-thread to perform database backup to the database backup record file.

7. The method for recovering data of the dual-machine hot standby system according to claim 6, further comprising:

sending the database backup record file to the shared storage; and deleting the flag file information.

8. The method for recovering data of the dual-machine hot standby system according to claim 6, wherein the creating of the API calling information file comprises:

when the current node performs add, delete, and modify operations, calling a third sub-thread to store called API information data and a calling time record to the API calling information file.

9. The method for recovering data of the dual-machine hot standby system according to claim 8, wherein the start-stop operation record file, the database backup record file, and the API calling information file are all saved and created by using a same format.

10. The method for recovering data of the dual-machine hot standby system according to claim 8, wherein, when the flag file information does not exist, the method further comprises:

calling the third sub-thread to store API calling information of the current node.

11. The method for recovering data of the dual-machine hot standby system according to claim 6, wherein determining the main service running time period of the current node according to the start-stop operation record files, and determining the start-stop time period of the opposite end node according to the main service running time period comprises:

comparing first time points of start times corresponding to start and stop operations that are earliest recorded in the start-stop operation record files;

tracking second time points of stop times corresponding to the start and stop operations according to the first time points;

using a time period between the first time point and the second time point as a first time period, wherein the first time period is used as the main service running time period of the current node corresponding to the first time point and the second time point;

determining whether the opposite end node has start times of the start and stop operations of the opposite end node within the main service running time period;

in a case that the opposite end node has the start times of the start and stop operations of the opposite end node within the main service running time period, using the start times of the opposite end node as third time points, and tracking fourth time points of stop times corresponding to the start and stop operations of the opposite end node according to the third time points;

using a time period between the third time point and the fourth time point as a second time period, wherein the second time period is used as the start-stop time period of the opposite end node corresponding to the third time point and the fourth time point; and in a case that the opposite end node does not have the start times of the start and stop operations of the opposite end node within the main service running time period, acquiring, from the start-stop operation record file of the opposite end node, a new first time point of the start time that appears adjacent to the first time period, and returning to the step of tracking the second time points of the stop times corresponding to the start and stop operations according to the first time points.

12. The method for recovering data of the dual-machine hot standby system according to claim 11, wherein determining the initial split-brain time according to the relationship between the start-stop time period and the main service running time period comprises:
  determining, as the initial split-brain time, a time period between the third time point corresponding to the start-stop time period and the second time point corresponding to the main service running time period, wherein the second time period is greater than the third time point.

13. The method for recovering data of the dual-machine hot standby system according to claim 12, wherein reading the record information of the database backup record files within the initial split-brain time to determine the final split-brain time comprises:
  determining whether the record information of the time point within the initial split-brain time exists in the database backup record file; and
  in a case that the record information of the time point within the initial split-brain time exists in the database backup record file, using the time point as a start point, and using a time period between the start point and the second time points corresponding to the initial split-brain time as the final split-brain time.

14. The method for recovering data of the dual-machine hot standby system according to claim 13, further comprising:
  in a case that the record information of the time point within the initial split-brain time does not exist in the database backup record file, performing data recovery according to the initial split-brain time.

15. The method for recovering data of the dual-machine hot standby system according to claim 13, wherein reading the API calling information files according to the final split-brain time, so as to recover the data comprises:
  using a time point of the final split-brain time as a start point to acquire the current node as a master node for recovery;
  reading the API calling information file according to the earliest time, and performing recovery at the master node; and
  after the master node reads the API calling information file, synchronizing recovered data at the master node to another node, so as to complete data recovery.

16. The method for recovering data of the dual-machine hot standby system according to claim 15, wherein reading the API calling information file according to the earliest time, and performing recovery at the master node comprises:
  reading the API calling information file from the shared storage;
  using the time point of the final split-brain time as the start point to cause, according to a chronological order, the dual-machine hot standby system to automatically execute, step by step, operations recorded in the API calling information file; and
  when the operations recorded in the API calling information file are executed, completing data recovery on the master node.

17. The method for recovering data of the dual-machine hot standby system according to claim 6, wherein after creating the database backup record file of the current node, the method further comprises:
  deleting the flag file information of the current node.

18. The method for recovering data of the dual-machine hot standby system according to claim 2, further comprising:
  Running and monitoring a process of service changes in two devices with dual-machine hot standby system, and when one device background starts a main service and a stop service, recording start or stop information in the shared storage.

19. A apparatus for recovering data of a dual-machine hot standby system, comprising:
  a memory, configured to store a computer program; and
  a processor, configured to execute the computer program so as to:
  acquire start-stop operation record files, database backup record files, and Application Programming Interface (API) calling information files, which correspond to two nodes of a dual-machine hot standby system;
  determine a main service running time period of a current node according to the start-stop operation record files, and determine a start-stop time period of an opposite end node according to the main service running time period;
  when the start-stop time period is in the main service running time period, determine an initial split-brain time according to a relationship between the start-stop time period and the main service running time period; and
  read record information of the database backup record files within the initial split-brain time to determine a final split-brain time, and read the API calling information files according to the final split-brain time, so as to recover data.

20. A non-transitory computer-readable storage medium, having a computer program stored thereon, wherein the computer program, when executed by a processor, cause the processor is enabled to:
  acquire start-stop operation record files, database backup record files, and Application Programming Interface (API) calling information files, which correspond to two nodes of a dual-machine hot standby system;
  determine a main service running time period of a current node according to the start-stop operation record files, and determine a start-stop time period of an opposite end node according to the main service running time period;
  when the start-stop time period is in the main service running time period, determine an initial split-brain time according to a relationship between the start-stop time period and the main service running time period; and
  read record information of the database backup record files within the initial split-brain time to determine a final split-brain time, and read the API calling information files according to the final split-brain time, so as to recover data.

* * * * *